(12) United States Patent
Murata et al.

(10) Patent No.: US 9,135,325 B2
(45) Date of Patent: Sep. 15, 2015

(54) INFORMATION PROCESSING APPARATUS, COMPUTER-READABLE RECORDING MEDIUM, AND INFORMATION PROCESSING METHOD

(71) Applicant: FUJITSU LIMITED, Kawasaki-shi, Kanagawa (JP)

(72) Inventors: Miho Murata, Kawasaki (JP); Yuichi Tsuchimoto, Kawasaki (JP); Toshiaki Saeki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 188 days.

(21) Appl. No.: 13/832,879

(22) Filed: Mar. 15, 2013

(65) Prior Publication Data

US 2013/0246427 A1 Sep. 19, 2013

(30) Foreign Application Priority Data

Mar. 19, 2012 (JP) ................................ 2012-062879

(51) Int. Cl.
*G06F 17/30* (2006.01)
*G06F 9/48* (2006.01)

(52) U.S. Cl.
CPC ........ *G06F 17/30598* (2013.01); *G06F 9/4881* (2013.01); *G06F 17/30* (2013.01); *G06F 17/30442* (2013.01)

(58) Field of Classification Search
CPC .................. G06F 17/30598; G06F 17/30442; G06F 17/30; G06F 9/4881; G06F 11/1402; G06F 3/0644; G06F 3/0647; G06F 3/0604; G06F 3/0673; H04L 67/10
USPC .......... 707/737, 802; 711/166, 161, 162, 163, 711/167, 118, 119, 122, 114, 113, 112, 103, 711/152, 154, 173, 170, 153, 158, 159, 165, 711/E12.002, E12.069, E12.075, E12.091, 711/E12.001, E12.103, E12.059, E12.017; 714/6, 6.2, 6.32, 43, 48, 6.23, 6.12, 10, 714/37, E11.021, E11.062; 710/22, 5, 14, 710/52, 48
See application file for complete search history.

(56) References Cited

U.S. PATENT DOCUMENTS 6,101,525 A * 8/2000 Hecker .......................... 718/104
7,055,057 B2 * 5/2006 Achiwa .......................... 714/6.3
(Continued)

FOREIGN PATENT DOCUMENTS

JP 2010-128730 9/2010

OTHER PUBLICATIONS

Ari, Ismail, Gottwals, M. and Henze, D.—"Performance Boosting and Workload Isolation in Storage Area Networks with SANCache"—URI http://hdl.handle.net/10679/139—Collections Department of Computer Science; Date: Jan. 1, 2006—pp. 1-12.*

(Continued)

*Primary Examiner* — Anh Ly
(74) *Attorney, Agent, or Firm* — Staas & Halsey LLP (57) ABSTRACT

An information processing apparatus includes a first storage device that stores in a first storage area a first data group that includes a first plurality of data to be processed successively, and stores in a second storage area a second data group that includes a second plurality of data to be processed successively, a second storage device that includes a third storage area that stores a command to access data stored in the first storage area and a fourth storage area that stores a command to access data stored in the second storage area, and a processor configured to store, in a corresponding storage area of the third storage area and the fourth storage area, a received command, select one of the third storage area and the fourth storage area, and process one or more command stored in a selected storage area.

12 Claims, 8 Drawing Sheets

(56) References Cited

U.S. PATENT DOCUMENTS

| | | | |
|---|---|---|---|
| 7,098,526 B2* | 8/2006 | Kobayashi et al. | 257/660 |
| 7,194,594 B2* | 3/2007 | Asami et al. | 711/170 |
| 7,219,201 B2* | 5/2007 | Kasako et al. | 711/162 |
| 7,334,084 B2* | 2/2008 | Nagata | 711/114 |
| 8,447,941 B2* | 5/2013 | Kono et al. | 711/162 |
| 8,489,842 B2* | 7/2013 | Chittigala | 711/170 |
| 8,489,844 B2* | 7/2013 | Orikasa et al. | 711/170 |
| 8,914,540 B1* | 12/2014 | Barooah et al. | 709/238 |
| 2003/0195864 A1* | 10/2003 | Vishlitzky et al. | 707/1 |
| 2003/0234958 A1* | 12/2003 | Fritz et al. | 358/1.16 |
| 2005/0154937 A1* | 7/2005 | Achiwa | 714/6 |
| 2006/0221781 A1* | 10/2006 | Suzuki | 369/32.01 |
| 2007/0088869 A1* | 4/2007 | Kadota | 710/36 |
| 2007/0150680 A1* | 6/2007 | Kasako et al. | 711/162 |
| 2007/0220220 A1* | 9/2007 | Ziv et al. | 711/159 |
| 2007/0288700 A1* | 12/2007 | Tamura et al. | 711/147 |
| 2010/0287095 A1* | 11/2010 | Ueno | 705/41 |
| 2011/0082988 A1* | 4/2011 | Kono et al. | 711/161 |
| 2012/0017042 A1* | 1/2012 | Matsui et al. | 711/114 |
| 2014/0195760 A1* | 7/2014 | Iwamitsu et al. | 711/165 |
| 2014/0258615 A1* | 9/2014 | Matsui et al. | 711/114 |

OTHER PUBLICATIONS

Ivy Ong and Hyotaek Lim—"Dynamic Load Balancing and Network Adaptive Virtual Storage Service for Mobile Appliances"—Journal of Information Processing Systems, vol. 7, No. 1, Mar. 2011 DOI : 10.3745/JIPS.2011.7.1.053—pp. 53-62.*

* cited by examiner

| DATA KEY | SEGMENT ID |
|---|---|
| A0 | SEG95 |
| B0 | SEG38 |
| C0 | SEG24 |
| ... | ... |
| Oi | SEG24 |
| Pi | SEG62 |
| Qi | SEG17 |
| ... | ... |
| Xn | SEG38 |
| Yn | SEG73 |
| Zn | SEG31 |

FIG. 7

INFORMATION PROCESSING APPARATUS, COMPUTER-READABLE RECORDING MEDIUM, AND INFORMATION PROCESSING METHOD

CROSS-REFERENCE TO RELATED APPLICATIONS

This application is based upon and claims the benefit of priority of the prior Japanese Patent Application No. 2012-062879, filed on Mar. 19, 2012, the entire contents of which are incorporated herein by reference.

FIELD

The present disclosure relates to a information processing apparatus, a computer-readable recording medium, and information processing method

BACKGROUND

Some kind of data analysis systems performs, when a processing request is received, analysis processing at the time the processing request is received. As an example of this type of data analysis system, there is a measured-data processing apparatus that measures an event that has occurred at an observation target and transfers the measured data to the next stage. The measured-data processing apparatus includes a data receiving unit, which receives event information indicating the type of event that has occurred and, after the measurement regarding the event information is started, generates time information that includes an absolute elapsed time until the event has occurred. The measured-data processing apparatus also includes an internal buffer that temporarily accumulates the event information and the time information. The measured-data processing apparatus also includes a data amount determination unit that determines the amount of data accumulated in the internal buffer. When the amount of data satisfies a first level, where the data amount is the lowest, and if the usage ratio for of the amount of data in the internal buffer exceeds a first rising time threshold value, the data amount determination unit determines that the amount of data has reached a second level where there is more data than the first level. When the amount of data satisfies the second level and if the usage ratio is less than a first falling time threshold value, the data amount determination unit determines that the amount of data transmit has transmitted to the first level. The data amount determination unit further includes a data transfer unit. When it is determined that the data amount in the internal buffer is at the first level, the data transfer unit fetches the event information and the time information from the internal buffer, and transfers the fetched event information and the fetched time information to the next stage. When it is determined that the data amount in the internal buffer is at the second level, the data transfer unit fetches the event information and the time information from the internal buffer, and transfers the fetched event information and coarse time information obtained by degrading the precision level of the fetched time information to the next stage.

See, for example, Japanese Laid-Open Patent Publication No. 2010-128730.

In the measured-data processing apparatus described above, when the data arrival frequency is high, the amount of information is reduced by a certain amount and data are transferred at a period in which the data arrival frequency has decreased, so that the data transfer may be completed before the data arrival time.

However, since the number of accesses to data is not taken into account with the above measured-data processing apparatus, there is a problem with the efficiency of access to data stored in the storage device.

SUMMARY

According to an aspect of the embodiments, an information processing apparatus includes a first storage device that stores in a first storage area a first data group that includes a first plurality of data to be processed successively, and stores in a second storage area a second data group that includes a second plurality of data to be processed successively, a second storage device that includes a third storage area that stores a command to access data stored in the first storage area and a fourth storage area that stores a command to access data stored in the second storage area, and a processor configured to store, in a corresponding storage area of the third storage area and the fourth storage area, a received command, select one of the third storage area and the fourth storage area, and process one or more command stored in a selected storage area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Some kind of data analysis systems performs, when event information newly arrives, analysis processing at the time that the event information arrives. Herein, the event information (or, an event) refers to information that includes at least an access command, which is transmitted from a client terminal, to access data to be analyzed that is transmitted from a client terminal. In this case, the data analysis system refers to the data related to the event information to perform analysis processing, and reflects the result of the analysis processing on the retrieved data. As a result, a new event occurs. The data analysis system repeats processing until a new event does not occur.

Data referenced by the data analysis system while being processed is often accumulated in a storage medium having a large capacity and low speed, such as a hard disk ("a low speed storage medium"), in consideration of data size and data reliability. However, since it takes a relatively long time to access data stored in the low speed storage medium, processing may not finish within a given time when the arrival of the event information is faster than the completion of the processing that uses the data.

For this reason, for example, the following method has been proposed. A storage medium having a small capacity and a high speed, such as a memory ("a high speed storage medium"), is disposed before the low speed storage medium. Access commands to access the data stored in the low speed storage medium ("commands") are buffered in the high speed storage medium to some extent, and the access commands are processed together. For example, Native Command Queuing (NCQ) stores disk control commands in a queue, and then rearranges the disk control commands to an order in which either the rotation of the disk or the movement of a head is kept to a minimum before processing. Accordingly, random access to the disk does not occur for each control command.

However, when commands are stored until an upper limit of a queue is reached before processing, the amount of processing per unit time increases (that is, throughput increases), but it takes a relatively long time until a command stored in the queue firstly (the oldest command) starts. That is, after processing such as data transferring is requested, the delay time (latency) until the execution result of the requested processing is delivered becomes longer (that is, the latency becomes higher). Even thought the arrival frequency of events is low enough so that the data transfer to the low speed storage medium is sufficiently completed until the next event arrives, the data analysis system are waiting for start of the processing for the command stored in the queue firstly.

Conversely, processing without storing commands in a queue, that is, processing an event each time the event arrives, the latency may decrease but the throughput may not increase. In this case, when an event is processed without storing the most of commands in a queue, that is, an event processing is performed at each time the event arrives, the latency may decrease but the throughput may not be increased. In this case, when the arrival frequency of events is high, a next event may arrive while the command is being processed, so that the command processing may not be completed before the arrival of the next event.

Therefore, according to an aspect of an embodiment of the present disclosure, there is provided a technique in which the processing efficiency of access commands for data stored in a storage device that are acquired successively is improved.

Hereinafter, an embodiment of the present disclosure is described based on the accompanying drawings.

Figure 1:
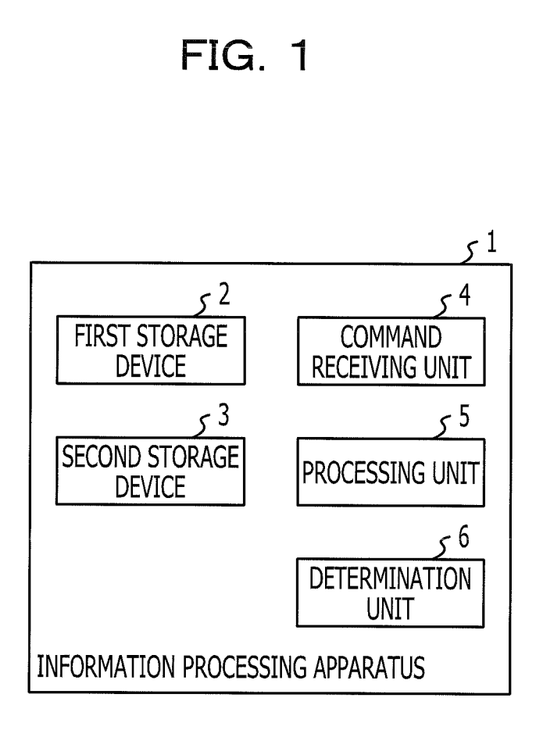
FIG. 1 is a view illustrating an example of an information processing apparatus according to an embodiment of the present disclosure.

FIG. 1 is an example of an information processing apparatus according to the present embodiment. The information processing apparatus 1 includes a first storage device 2, a second storage device 3, a command receiving unit 4, and a processing unit 5.

The first storage device 2 stores, in a first storage area, a first data group including a plurality of data to be processed successively. The first storage device 2 stores, in a second storage area, a second data group including a plurality of data to be processed successively. As an example, t the first storage device 2 includes storage area segmented to a plurality of segments and stores, in same segment, the data to be processed successively. As an example of the first storage device 2, a low speed storage medium 27 will be described below.

The second storage device 3 includes a third storage area that stores access commands for data stored in the first storage area and a fourth storage area that stores access commands for data stored in the second storage area. The second storage device 3 is able to be operated faster than the first storage device 2. As an example, the second storage device 3 operates faster than the first storage device 2, and for each segment includes a queue that stores access commands to access data. As for an example of the second storage device 3, a high speed storage medium 26 will be described below.

The command receiving unit 4 stores the received access command in a storage area corresponding to one of the plurality of storage areas provided in the second storage device. As an example, the command receiving unit 4 acquires the access commands to access data that continuously arrives from an external source and stores the acquired access commands in one of the queues. As an example of the command receiving unit 4, an event handling unit 21 will be described below.

The processing unit 5 selects one of the plurality of storage areas provided in the second storage device and processes one or more access commands stored in the selected storage area. As an example, the processing unit 5 selects a queue and processes the access commands that have accumulated within the selected queue. As for an example of the processing unit 5, a queue management unit 25 will be described below.

With the configuration described above, the processing efficiency of the Access commands to access the data stored in the storage device may be improved.

The processing unit 5 switches between a first selection method and a second selection method to alternately apply the methods according to how frequently access commands are received. The first selection method selects a storage area having the most commands stored therein among the plurality of storage areas provided in the second storage device. The second selection method selects a storage area having the oldest command stored therein among the plurality of storage areas provided in the second storage device. As an example, the processing unit 5 switches a selection method between the first selection method which selects a storage area having the most commands stored therein and the second selection method which selects another storage area having the oldest command stored therein, and applies the selected method according how frequently access commands arrive. For example, the processing unit 5 for the queue determines the rate at which to apply the first selection method such that the number of the access commands executed per unit time becomes greater than or equal to the number of access commands that arrive per unit time.

With the configuration described above, the rate at which to apply each command processing method may be adjusted according how frequently access commands arrive.

The information processing apparatus 1 further includes a determination unit 6. The determination unit 6 determines the storage area corresponding to the data targeted by the received access command, based on the storage area related information which includes storage area identification information identifying specific storage area from a plurality of storage areas provided in the second storage device and data identification information identifying data included in the storage area. As an example, the determination unit 6 determines a segment corresponding to the data targeted by the acquired access command, based on the segment related information which includes segment identification information identifying a segment and data identification information identifying data included in the segment. In this case, the command receiving unit 4 stores, based on the determination result, the received access command for the data in a corresponding storage area of the plurality of storage areas provided in the second storage device. As for an example of the determination unit 6, a segment management unit 23 will be described below.

With a configuration as described above, an access command may be stored in a queue that corresponds to the segment having data that the command is to access.

Figure 2:
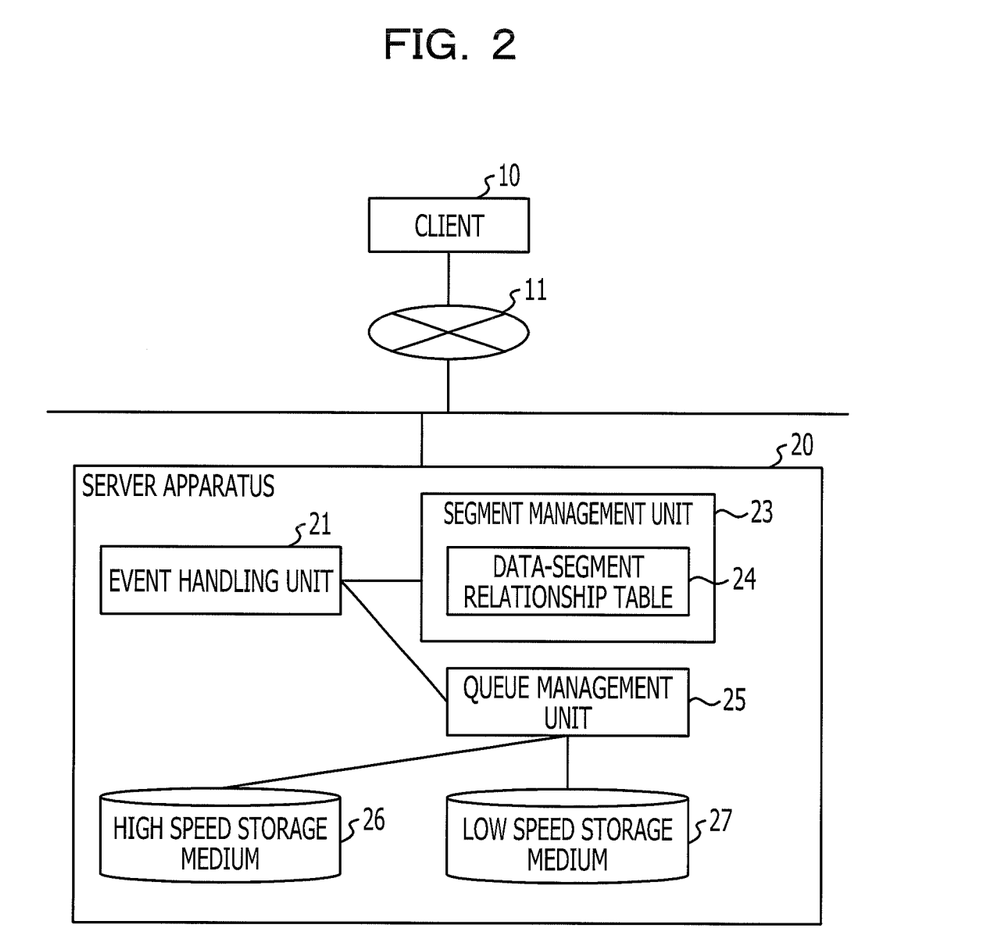
FIG. 2 is a view illustrating an example of a data analysis system according to the present embodiment.

The present embodiment will be described in detail below. FIG. 2 illustrates an example of a data analysis system according to the present embodiment. The data analysis system includes an information processing apparatus that serves as a client apparatus 10 ("a client") and another information processing apparatus that serves as a server apparatus 20 ("a server") 20. The client 10 and the server 20 are coupled with each other via a communication network 11 ("a network").

The client 10 transmits event information that includes the access commands for the data, which is to be analyzed, to the server 20 through the network 11.

The server 20 performs processing according to the event information transmitted from the client 10. The server 20 includes an event handling unit 21, a segment management unit 23, a queue management unit 25, the high speed storage medium 26 and the low speed storage medium 27.

The event handling unit 21 receives event information from the client 10 and extracts, from the received event information, the Access commands to access the data stored in the low speed storage medium 27. The event handling unit 21 makes an inquiry to the segment management unit 23 about which queue (a command accumulation queue), corresponding to a segment, to store the extracted commands. When a segment ID that identifies a segment is transmitted from the segment management unit 23 in response to the inquiry, the event handling unit 21 stores the command in a command accumulation queue that corresponds to the segment ID.

A segment and a command accumulation queue are related in a one-to-one relationship, and the event handling unit 21 may uniquely discriminate the command accumulation queue from the segment ID.

Segments are described herein. For example, the low speed storage medium 27 is partitioned in advance into multiple segments. When pieces of data successively acquired from the client 10 are grouped to be processed, the data is, for example, stored in the same segment to allow processing to be efficiently performed. A segment refers to a unit of partitioning of the storage area in the low speed storage medium 27. Storing the data in order to allow processing to be efficiently performed may include storing a group of data in the same segment, for example, to improve access efficiency to the disk, or storing a group of data in the same segment to be adjacently located on the disk, but is not limited thereto. In the present embodiment, information regarding which segment includes which data is pre-set on a data-segment relationship table 24 that indicates the correspondence relationship between the data and the segment.

The segment management unit 23 manages which segment of the low speed storage medium 27 each group of data is to be allocated to. The segment management unit 23 includes the data-segment relationship table 24 in which information that indicates the correspondence relationship between data and segment is stored. When there is an inquiry from the event processing unit 21 about which command accumulation queue for a segment to store the access commands for data corresponding to the segment, the segment management unit 23 performs the following processing. That is, using the data-segment relationship table 24, the segment management unit 23 acquires the segment ID of the segment that includes the intended storage location for the data. The segment management unit 23 transmits the acquired segment ID to the event handling unit 21.

The queue management unit 25 manages the command accumulation queue corresponding to each segment on the high speed storage medium 26 and manages a priority queue used to determine which command accumulation queue is selected to be processed, and processes the access commands included in the selected command accumulation queue. For example, the queue management unit 25 periodically selects a command accumulation queue based on a given priority from the group of all command accumulation queues and processes all of the access commands included in the selected command accumulation queue.

The high speed storage medium 26 has a small capacity and is a fast storage medium, such as a memory. The high speed storage medium 26 maintains a command accumulation queue for each segment and a priority queue for determining which command accumulation queue is processed first. The number of priority queues is set to be the same as the number of types of the selection method for the command accumulation queue (policy). For example, when two types of policy, a throughput priority policy and a latency priority policy, are applied to select a command accumulation queue, two types of priority queues are set in the high speed storage medium 26.

The low speed storage medium 27 has a large capacity and is a slow storage medium, such as a hard disk drive. The low speed storage medium 27 maintains data in each segment.

Figure 3:
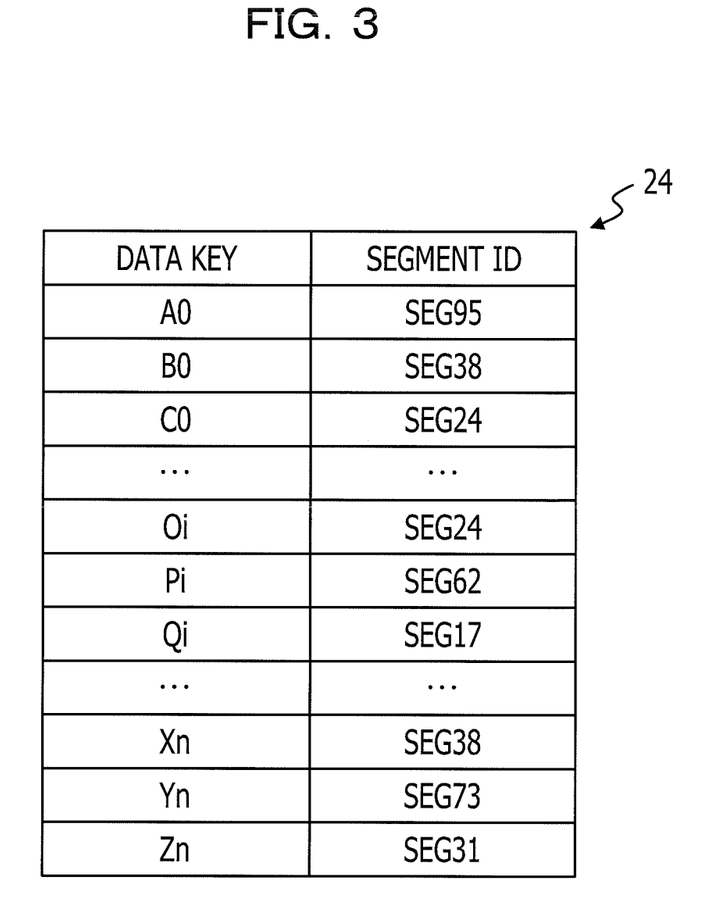
FIG. 3 is a view illustrating an example of a data-segment relationship table 24 according to the present embodiment.

FIG. 3 illustrates an example of the data-segment relationship table 24 in the present embodiment. The data-segment relationship table 24 includes data fields such as "data key" and "segment ID". The field for "data key" stores unique information (that is, a key) assigned to data. The field for "segment ID" stores the ID corresponding to the segment for the storage location of the data.

For example, data specified by a data key "CO" and data specified by a data key "Oi" are determined to be successively accessed and are allocated to the same segment Seg24. Further, data specified by a data key "BO" and data specified by a data key "Xn" are determined to be successively accessed and are allocated to the same segment Seg38.

Figure 4:
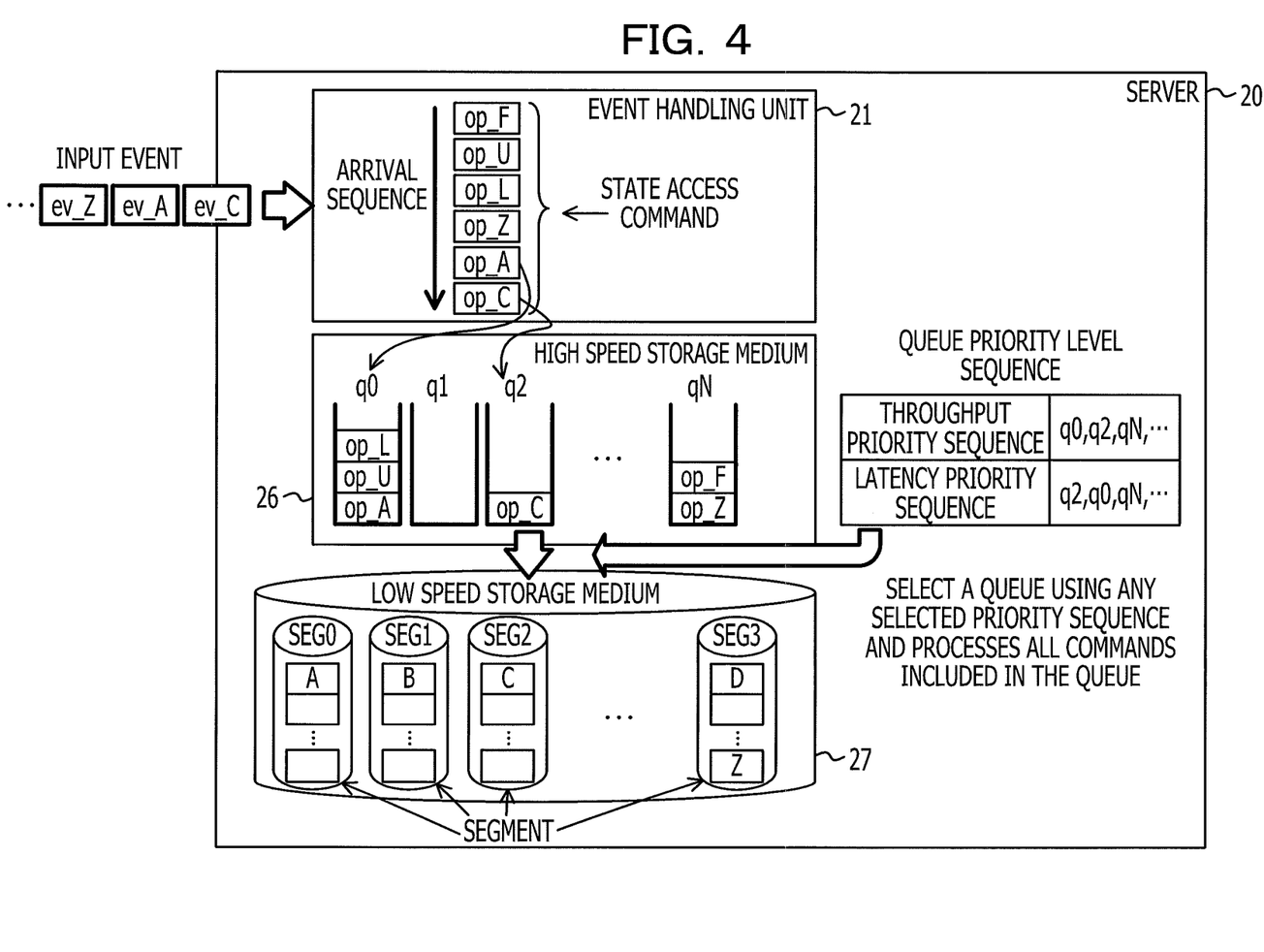
FIG. 4 is an explanatory view according to the present embodiment illustrating server operations performed after event information arrives and until an access command is processed.

FIG. 4 is an explanatory view illustrating server operations that are performed from when an event arrives until the corresponding access command is processed, according to the present embodiment. As described above, in the present embodiment, data corresponding to the event information that successively arrives from the client 10 are handled by grouping in a per-segment basis. An accumulation of data from the high speed storage medium 26 to the low speed storage medium 27 and an uploading of data from the low speed storage medium 27 to the high speed storage medium 26 are also performed on a per-segment basis.

The following processes are performed under the conditions described above. First of all, for each segment, a corresponding command accumulation queue is configured in the high speed storage medium 26. The event handling unit 21 stores the access command transmitted from the client 10 that is for data stored in the low speed storage medium 27 in the command accumulation queue.

For each specific period of time, the queue management unit 25 selects a command accumulation queue to be processed from a plurality of the command accumulation queues and processes all of the access commands included in the selected command accumulation queue together. When selecting the command accumulation queue to be processed from the plurality of command accumulation queues, for example, the queue management unit 25 determines in advance a priority order for the command accumulation queues using the following two types of policies and selects the command accumulation queue in accordance with the determined order. The queue management unit 25 recalculates the priority each time a command arrives.

(1) With the throughput priority policy, the queue management unit 25 selects a command accumulation queue having the most commands included therein as the highest priority. That is, with the throughput priority policy, the queue management unit 25 determines the priority level of a command accumulation queue based on the number of commands stored therein.

(2) With the latency priority policy, the queue management unit 25 selects a command accumulation queue having the oldest command included therein as the highest priority. That is, with the latency priority policy, the queue management unit 25 determines the priority level of a command accumulation queue based on the timestamp of the oldest command stored therein.

When selecting a command accumulation queue, the queue management unit 25 uses a ratio to determine which of the throughput or latency priority policies to apply. For example, when the throughput priority policy and the latency priority policy are applied in a one-to-one ratio, the queue management unit 25 applies the throughput priority policy and the latency priority policy alternately. The application ratio for the policies may be adjusted.

As described above, since the selection method of the command accumulation queue is not fixed but is adjustable, even when the frequency at which event information arrives is not constant, the processing of the command may be completed to be ready for the arrival of a new event and does not cause excessively wasteful waiting time for processing.

Figure 5:
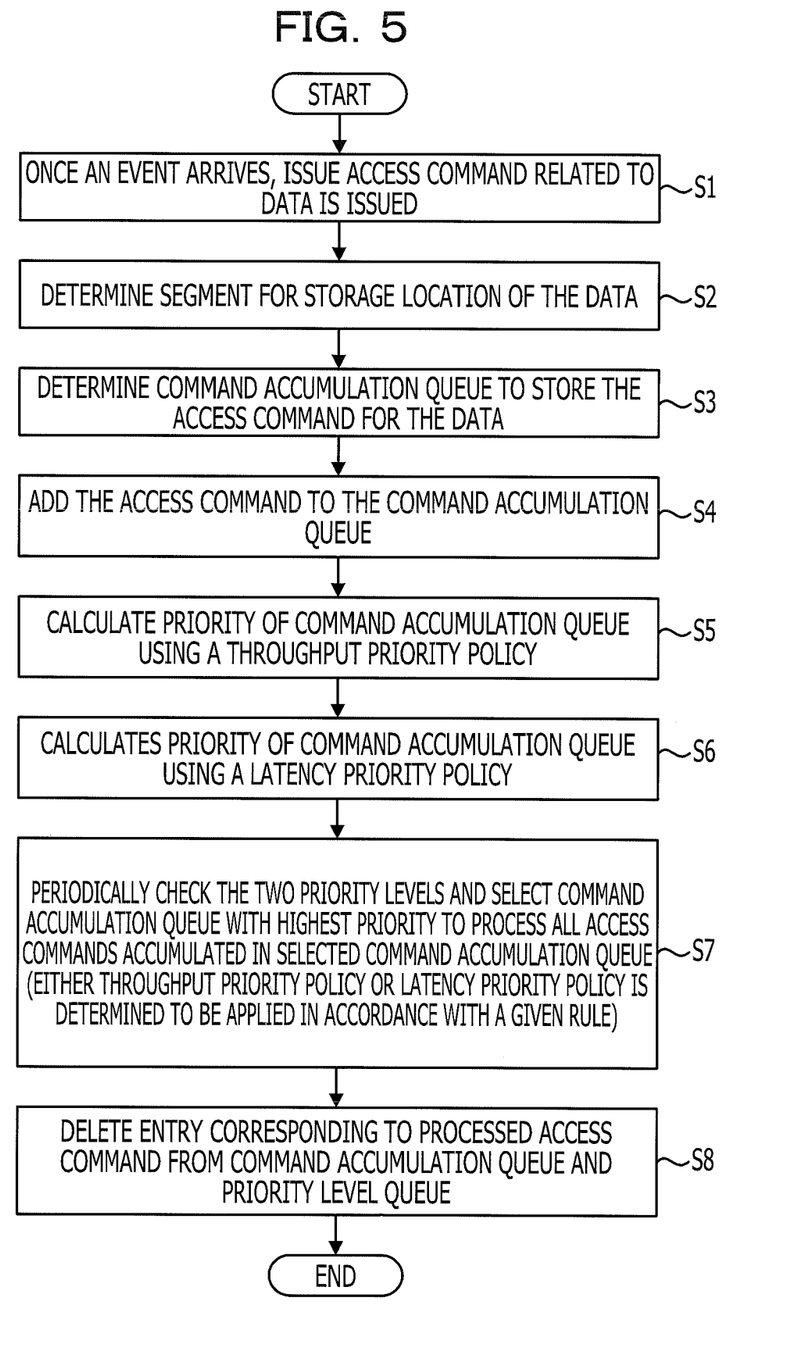
FIG. 5 illustrates an example according to the present embodiment of a processing flow performed until an access command is processed after event information arrives.

FIG. 5 is a flowchart illustrating an example of a processing flow performed from the arrival of event information to the processing of the access command in the present embodiment. As described in FIG. 4, when event information from the client 10 arrives at the event handling unit 21 of the server 10, a state access command for data related to the event information is issued (S1). That is, when the event handling unit 21 receives event information transmitted from the client 10, the event handling unit 21 extracts an access command for data stored in the low speed storage medium 27 based on the received event information.

The event handling unit 21 consults the segment management unit 23 about which command accumulation queue corresponding to a segment to store the extracted access command. Accordingly, the segment management unit 23 obtains the segment ID for the storage location of the data that is to be accessed (S2). For example, based on the data-segment relationship table 24, the segment management unit 23 acquires the segment ID of the segment that corresponds to the storage location of the data. The segment management unit 23 then transmits the acquired segment ID for the storage location to the event handling unit 21.

The event handling unit 21 uses the segment ID transmitted from the segment management unit 23 to obtain a command accumulation queue that stores the access command for the data transmit (S3). That is, the event handling unit 21 selects a command accumulation queue that corresponds to the segment ID transmitted from the segment management unit 23.

The event handling unit 21 adds the access command to the selected command accumulation queue, that is, the command accumulation queue that corresponds to the segment ID transmitted from the segment management unit 23 (S4).

The queue management unit 25 calculates the priority level of the command accumulation queue using the throughput priority policy (S5). The queue management unit 25 also calculates the priority level of the command accumulation queue using the latency priority policy (S6).

The queue management unit 25 periodically checks the two priority levels, selects the command accumulation queue with the highest priority, and processes all the access commands accumulated in the selected command accumulation queue (S7). At this point, the queue management unit 25 applies either the throughput priority policy or the latency priority policy in accordance with a given rule. As an example of the given rule, the queue management unit 25 may alternately switch the policy between the throughput priority policy and the latency priority policy each time a given period of time elapses. Alternatively, the queue management unit 25 may change the application ratio of the throughput priority policy and the latency priority policy according to the arrival frequency of event information.

The queue management unit 25 deletes the entry corresponding to a processed access command from the command accumulation queue and the priority queue (S8). Here, an entry refers to each command stored in a command accumulation queue or a unit of information stored in a priority queue.

Figure 6A:
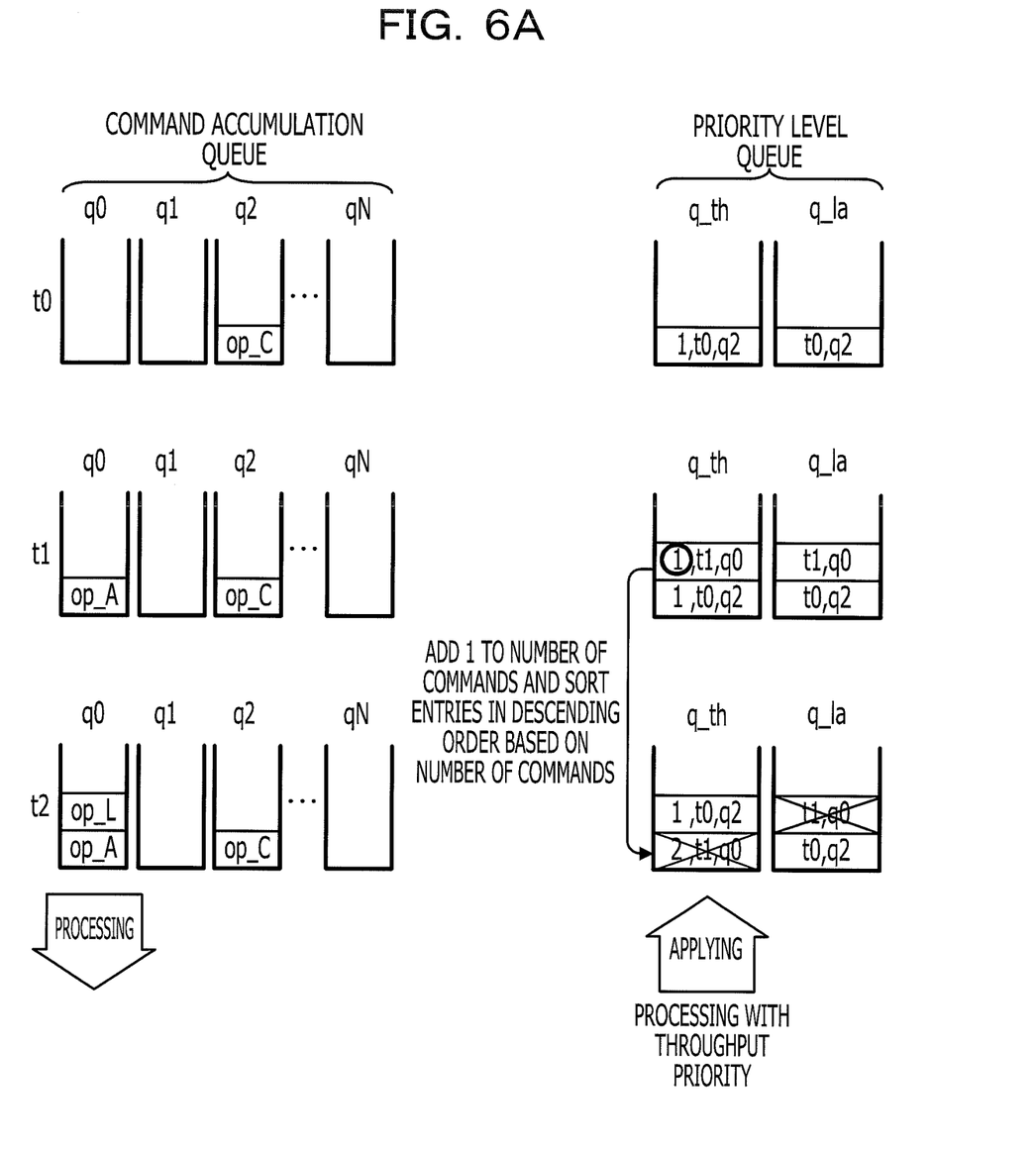
FIG. 6A is a first view illustrating an example of a priority level calculation method of a command accumulation queue according to the present embodiment.
Figure 6B:
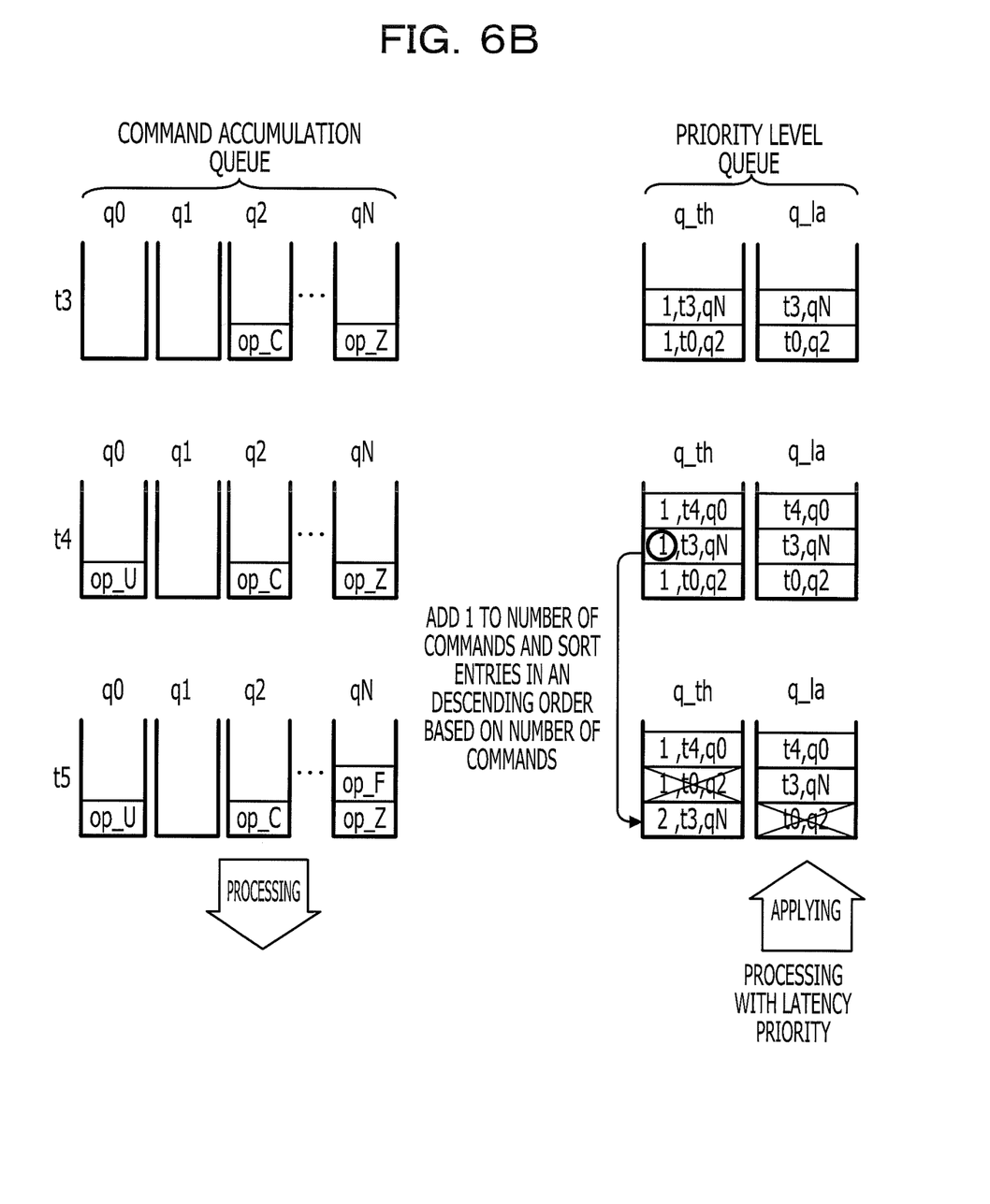
FIG. 6B is a second view illustrating the example of the priority level calculation method of the command accumulation queue according to the present embodiment.

FIGS. 6A and 6B are views illustrating an example of a priority level calculation method of a command accumulation queue, according to the present embodiment. Each of t0 to t5 represents both a time when a command is added to a command accumulation queue and a time when a command accumulation queue is selected. The queue management unit 25 manages the priority levels of the command accumulation queues q0, q1, q2, . . . , qN using a priority queue. In the present embodiment, the queue management unit 25 manages the priority queue q_th for the throughput priority policy and the priority queue q_la for the latency priority policy.

Each entry in the priority queue q_th includes the fields "number of commands", "the oldest command timestamp" and "command accumulation queue identification information (ID)". The queue management unit 25 stores entries in the priority queue q_th that are sorted in descending order of the number of commands. When there are a plurality of entries which have the same number of commands, the queue management unit 25 stores the entries in descending order of the command timestamp.

The queue management unit 25 adds an entry that includes fields "command timestamp" and "command accumulation queue identification information (ID)" to the priority queue q_la only when a command is freshly stored in each of the command accumulation queues q0 to qN, where the priority queue q_la is ordered by the command timestamp of each entry. Therefore, only the entries that include the oldest timestamp of each command accumulation queue are stored in the priority queue q_la.

When selecting the command accumulation queue, the queue management unit 25 selects either the priority queue q_th or the priority queue q_la according to the application rate of the throughput priority policy and the latency priority policy. The queue management unit 25 selects the command accumulation queue that corresponds to the first entry of the selected priority queue. The queue management unit 25 processes all the commands included in the selected command accumulation queue, and deletes the entry that corresponds to the selected command accumulation queue from the priority queue.

FIG. 6A and FIG. 6B illustrate an example in which the throughput priority policy and the latency priority policy are applied with a one-to-one ratio. In the present embodiment, once a given amount of time has elapsed, the queue management unit 25 alternately switches the application of the policy between the throughput priority policy and the latency priority policy. In FIG. 6A and FIG. 6B, the throughput priority policy and the latency priority policy are alternately applied by being switched between each other every amount of time of length t3. Therefore, the queue management unit 25 applies the throughput priority policy at t2 and applies the latency priority policy at t5.

At t0, the event handling unit 21 adds a command op_C to the command accumulation queue q2 which corresponds to the segment 2, based on the segment ID transmitted from the segment management unit 23. The queue management unit 25 adds an entry with (number of commands, the oldest command timestamp, ID of command accumulation queue)=(1, t0, q2) to the priority queue q_th. Further, the queue management unit 25 adds an entry with (command timestamp, ID of command accumulation queue)=(t0, q2) to the priority queue q_la.

At t1, the event handling unit 21 adds a command op_A to the command accumulation queue q0 which corresponds to the segment 0, based on the segment ID transmitted from the segment management unit 23. The queue management unit 25 adds an entry with (number of commands, the oldest command timestamp, ID of command accumulation queue)=(1, t1, q0) to the priority queue q_th. Further, the queue management unit 25 adds an entry with (command timestamp, ID of command accumulation queue)=(t1, q0) to the priority queue q_la.

At t2, the event handling unit 21 adds the command op_L to the command accumulation queue q0 which corresponds to the segment 0, based on the segment ID transmitted from the segment management unit 23. Since an additional command has been added to the command accumulation queue q0, the queue management unit 25 adds "1" to the "number of commands" of the entry which is for the command accumulation queue q0 and was previously added to the priority queue q_th. The queue management unit 25 then sorts the entries included in the priority queue q_th by into a descending order of the number of commands. Further, since the entry for command op_L is not the first entry in the command accumulation queue q0, the queue management unit 25 does not add a new entry to the priority queue q_la.

In this example, since the throughput priority policy is applied at t2, the queue management unit 25 processes all the commands, that is, the op_A and the op_L, that are included in the command accumulation queue q0 which corresponds to the leading entry of the priority queue q_th. The queue management unit 25 deletes the entry (2,t1,q0) for the processed command accumulation queue q0 from the priority queue q_th, and deletes the entry (t1,q0) for the processed command accumulation queue q0 from the priority queue q_la.

At t3, the event handling unit 21 adds a command op_Z to the command accumulation queue qN which corresponds to the segment N, based on the segment ID transmitted from the segment management unit 23. The queue management unit 25 adds an entry with (number of commands, command timestamp, ID of command accumulation queue)=(1, t3, qN) to the priority queue q_th. Further, the queue management unit 25 adds an entry with (command timestamp, ID of command accumulation queue)=(t3, qN) in the priority queue q_la.

At t4, the event handling unit 21 adds the command op_U to the command accumulation queue q0 which corresponds to the segment 0, based on the segment ID transmitted from the segment management unit 23. The queue management unit 25 adds an entry with (number of commands, command timestamp, ID of command accumulation queue)=(1, t4, q0) to the priority queue q_th. Further, the queue management unit 25 adds an entry with (command timestamp, ID of command accumulation queue)=(t4, q0) to the priority queue q_la.

At t5, the event handling unit 21 adds the command op_F to the command accumulation queue qN which corresponds to the segment N, based on the segment ID transmitted from the segment management unit 23. Since an additional command has been added to the command accumulation queue qN, the queue management unit 25 adds "1" to the "number of commands" of the entry for the command accumulation queue qN that was previously added to the priority queue q_th. The queue management unit 25 then stacks the entries included in the priority queue q_th by sorting the entries into a descending order of the number of commands. Further, since the entry for command op_F is not the first entry in the command accumulation queue q0, the queue management unit 25 does not add a new entry to the priority queue q_la.

In this example, since the latency priority policy is applied at t5, the queue management unit 25 processes the command op_C included in the command accumulation queue q2 which corresponds to the first entry of the priority queue q_la. The queue management unit 25 deletes the entry (1, t0, q2) related to the processed command accumulation queue q2 from the priority queue q_th, and deletes the entry (t0, q2) related to the processed command accumulation queue q2 from the priority queue q_la.

Accordingly, access commands for data stored on the low speed storage medium are queued for each piece of data that is to be successively accessed, and an arbitrary command accumulation queue is selected periodically so that the commands included in the selected command accumulation queue may be grouped and processed together.

Subsequently, the method for applying the throughput priority policy and the latency priority policy will be described. When periodically selecting a command accumulation queue having commands stacked therein, the queue management unit 25 selects the throughput priority queue q_th with the rate r and selects the latency priority queue q_la with the rate of 1−r (0<r<1). The queue management unit 25 may set the rate r to a relatively high value when the event arrival frequency is high, and set the ratio of r to a relatively low value when the event arrival frequency is low.

Further, the queue management unit 25 may automatically determine and set the rate r according to the event arrival frequency. In this case, the event arrival frequency per unit time is represented as F1 (events/second), and the number of processed commands per unit time is represented as F2 (operations/second).

When only the throughput priority policy is applied, the number of commands that can be processed per unit time is represented as FT (operations/second). This value may be measured separately and obtained, or may be the number of processed commands per unit time when r is set to "1".

When only the latency priority policy is applied, the number of commands that can be processed per unit time is represented as FL (operations/second). This value may be obtained by a separate measurement, or may be the number of processed commands per unit time when r is set to "0".

F2 is determined by the following formula using FT and FL.

$$F2=FT*r+FL*(1-r)$$

The value of r is obtained so that the relationship of $F2 \geq F1$ is satisfied. The time interval during which a command accumulation queue is selected and commands contained in the selected command accumulation queue are processed is set so that the relationship of $FT \geq F1$ is satisfied. When the time interval is too short, the number of commands accumulated in the command accumulation queue becomes smaller, that is, the number of commands that can be processed at a time becomes smaller so that the relationship of $F1<FT$ is satisfied.

The event arrival frequency may be obtained as follows. First of all, the event handling unit 21 measures the number of arrivals of event information per unit time (an event arrival frequency) and notifies the queue management unit 25 of the measured event arrival frequency. Accordingly, the queue management unit 25 may acquire the event arrival frequency.

Accordingly, when periodically selecting a command accumulation queue to be processed from the plurality of the command accumulation queues, it is possible to prefer to select a command accumulation queue having the most commands included therein at a predetermined rate first and then prefer to select another command accumulation queue having the oldest command included therein at the remaining rate. Further, the rate may be determined so that the number of processed commands per unit time to be greater than or equal to the number of event arrivals per unit time.

Figure 7:
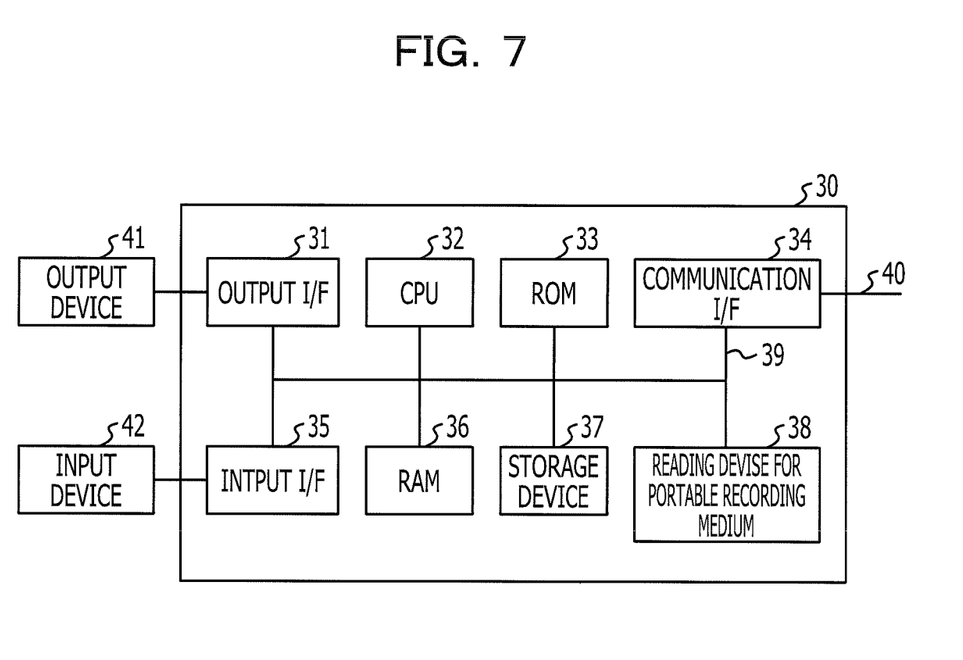
FIG. 7 is a block diagram illustrating an example of the configuration of a computer hardware environment to which the present embodiment is applied.

FIG. 7 illustrates an example of a block diagram of a computer hardware environment to which the present embodiment has been applied. The computer 30 reads-in a program which executes the processing of the present embodiment to serve as the command receiving unit 4, processing unit 5 and determination unit 6.

The computer 30 includes an output interface (I/F) 31, a central processing unit (CPU) 32, a read-only memory (ROM) 33, a communication I/F 34, an input I/F 35, a random access memory (RAM) 36, a storage device 37, a reading device 38, and a bus 39. The computer 30 may be coupled with an output device 41 and an input device 42.

The output I/F 31, the CPU 32, the ROM 33, a communication I/F 34, an input I/F 35, the RAM 36, a storage device 37, a reading device 38 are coupled with the bus 39. The reading device 38 reads-out the contents of a portable recording medium. The output device 41 is coupled with the output I/F 31 and the input device 42 is coupled with the input I/F 35.

Various types of storage devices such as, for example, a hard disk drive, a flash memory device or a magnetic disk device may be used as the storage device 37.

The storage device 37 or the ROM 33 stores, for example, a program, data, and the data-segment relationship table 24 that implement the processing described in the present embodiments. The storage device 37 corresponds to the low speed storage medium 27. The RAM 36, for example, may be used as a temporary accumulating buffer area and may be used as a working storage area. The RAM 36 corresponds to the high speed storage medium 26.

The CPU 32 reads-out a program stored, for example, in the storage device 37 to implement the processing described in the present embodiment, and executes the program to implement the processing flow illustrated in FIG. 5. Further, the processing that implements the processing flow illustrated in FIG. 5 may be executed as a software process operating on an operating system (OS).

The program that implements the processing described in the present embodiment may be stored, for example, in the storage device 37 via the communication network 40 and the communication I/F 34 by a program provider. Further, the program that implements the processing described in the present embodiment may be stored in a portable storage medium which is commercially available. In this case, the portable storage medium may be set in the reading device 38 to allow the program to be read-out and executed by the CPU 32. Various types of storage media such as, for example, a CD-ROM, a floppy disk, an optical disk, an magneto-optical disk, an integrated circuit (IC) card, or a Universal Serial Bus (USB) memory device may be used as the portable storage medium. The programs stored in the storage medium may be read-out by the reading device 38.

Further, a keyboard, a mouse, an electronic camera, a web camera, a microphone, a scanner, a sensor, a tablet, a touch panel may be used as the input device 42. A display, a printer and a speaker may be used as an output device 42. Still further, the network 40 may be the Internet, a local area network (LAN), a wide area network (WAN), a dedicated line, or, a wired or a wireless communication network.

The embodiments according to the present disclosure are not limited to the above-described embodiments, but various configurations and embodiment may be made thereto without departing from the substance of the embodiments of the present disclosure.

According to an embodiment of the present disclosure, the processing efficiency of access commands for data stored in a storage device may be improved.

All examples and conditional language recited herein are intended for pedagogical purposes to aid the reader in understanding the invention and the concepts contributed by the inventor to furthering the art, and are to be construed as being without limitation to such For example recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. An information processing apparatus, comprising:
a first storage device that stores in a first storage area a first data group that includes a first plurality of data to be processed successively, and stores in a second storage area a second data group that includes a second plurality of data to be processed successively;
a second storage device that includes a third storage area that stores a command to access data stored in the first storage area and a fourth storage area that stores a command to access data stored in the second storage area; and
a processor configured to:
store a received command, in a corresponding storage area of one of the third storage area and the fourth storage area, to allow data processing to be performed efficiently and improve access efficiency of the information processing apparatus;
determine a selection policy from among a first selection policy and a second selection policy based on a predetermined condition, the first selection policy being a policy for selecting a storage area that stores most commands from the third storage area and the fourth storage area, the second selection policy being a policy for selecting a storage area that stores an oldest command from the third storage area and the fourth storage area;
select one of the third storage area and the fourth storage area based on the determined selection policy; and
process at least one command stored in the selected one of the third storage area and the fourth storage area.

2. The information processing apparatus according to claim 1, wherein the selection policy is determined according to a receipt frequency of a plurality of commands.

3. The information processing apparatus according to claim 2, wherein the processor is configured to:
   determine a rate of the first selection policy to be applied such that a number of commands processed per unit time becomes greater than or equal to a number of commands received per unit time.

4. The information processing apparatus according to claim 1, wherein the processor is configured to:
   determine, for the storing of the received command, a storage area corresponding to data targeted by the received command, based on storage area related information that includes storage area identification information identifying any one of the third storage area and the fourth storage area and data identification information identifying data included in the storage area.

5. A non-transitory computer-readable recording medium having stored therein a program for causing a server apparatus to execute a process, comprising:
   receiving a command to access data stored in a first storage device in which a first data group that includes a first plurality of data to be processed successively is stored in a first storage area and a second data group that includes a second plurality of data to be processed successively is stored in a second storage area;
   storing the received command, in a corresponding storage area of one of a plurality of storage areas included in a second storage device, to allow processing to be performed efficiently and improve access efficiency of the server apparatus, the second storage device including a third storage area configured to store a command to access data stored in the first storage area and a fourth storage area that stores a command to access data stored in the second storage area;
   determining a selection policy from among a first selection policy and a second selection policy based on a predetermined condition, the first selection policy being a policy for selecting a storage area that stores most commands from the third storage area and the fourth storage area, the second selection policy being a policy for selecting a storage area that stores an oldest command from the third storage area and the fourth storage area;
   selecting one of the third storage area and the fourth storage area based on the determined selection policy; and
   processing at least one command stored in the selected one of the third storage area and the fourth storage area.

6. The non-transitory computer-readable recording medium according to claim 5, wherein the selection policy is determined according to a receipt frequency of a plurality of commands.

7. The non-transitory computer-readable recording medium according to claim 6, wherein the process comprises:
   determining a rate of the first selection policy to be applied such that a number of commands processed per unit time becomes greater than or equal to a number of commands received per unit time.

8. The non-transitory computer-readable recording medium according to claim 5, wherein the process comprises:
   determining, for the storing, a storage area corresponding to data targeted by the received command, based on storage area related information that includes storage area identification information identifying any one of the third storage area and the fourth storage area and data identification information identifying data included in the storage area.

9. An information processing method comprising:
   receiving a command to access data stored in a first storage device in which a first data group that includes a first plurality of data to be processed successively is stored in a first storage area and a second data group that includes a second plurality of data to be processed successively is stored in a second storage area;
   storing the received command, in a corresponding storage area of one of a plurality of storage areas included in a second storage device, to allow data processing to be performed efficiently and improve access efficiency of an information processing apparatus, the second storage device including a third storage area configured to store a command to access data stored in the first storage area and a fourth storage area that stores a command to access data stored in the second storage area;
   determining a selection policy from among a first selection policy and a second selection policy based on a predetermined condition, the first selection policy being a policy for selecting a storage area that stores most commands from the third storage area and the fourth storage area, the second selection policy being a policy for selecting a storage area that stores an oldest command from the third storage area and the fourth storage area;
   selecting one of the third storage area and the fourth storage area based on the determined selection policy; and
   processing at least one command stored in the selected one of the third storage area and the fourth storage area.

10. The information processing method according to claim 9, wherein the selection policy is determined according to a receipt frequency of a plurality of commands.

11. The information processing method according to claim 10, further comprising:
   determining a rate of the first selection policy to be applied such that a number of commands processed per unit time becomes greater than or equal to a number of commands received per unit time.

12. The information processing method according to claim 9, further comprising:
   determining, for the storing, a storage area corresponding to data targeted by the received command, based on storage area related information that includes storage area identification information identifying any one of the third storage area and the fourth storage area and data identification information identifying data included in the storage area.

* * * * *